United States Patent [19]
Gitnes

[11] Patent Number: 5,901,817
[45] Date of Patent: May 11, 1999

[54] TORQUE LIMITER WITH TRIP INDICATOR

[75] Inventor: Seth E. Gitnes, Everett, Wash.

[73] Assignee: The Boeing Company, Seattle, Wash.

[21] Appl. No.: 08/844,449

[22] Filed: Apr. 18, 1997

[51] Int. Cl.⁶ ....................................................... B60J 7/12
[52] U.S. Cl. ............................................ 188/134; 192/8 R
[58] Field of Search ............................... 188/82.3, 82.84, 188/134; 192/7, 8 R, 15, 56.54

[56] References Cited

U.S. PATENT DOCUMENTS

| | | | |
|---|---|---|---|
| 3,596,740 | 8/1971 | Nau ......................................... | 188/134 |
| 3,835,967 | 9/1974 | Kerr ......................................... | 188/134 |
| 4,030,578 | 6/1977 | Cacciola et al. ......................... | 188/134 |
| 4,176,733 | 12/1979 | Twickler .................................. | 188/134 |
| 4,625,843 | 12/1986 | Maltby et al. ............................ | 188/134 |
| 5,199,538 | 4/1993 | Fischer et al. ........................... | 188/134 |
| 5,299,666 | 4/1994 | Lang et al. ............................... | 188/134 |
| 5,630,490 | 5/1997 | Hudson et al. ........................... | 188/134 |

*Primary Examiner*—Chris Schwartz
*Attorney, Agent, or Firm*—Mary Y. Redman; Bernard A. Donahue

[57] ABSTRACT

The torque limiter described herein is a device for preventing the transmission of torque from a drive source to a torque responsive element when a predetermined torque limit has been reached. The device also provides subsequent mechanical indication that the predetermined torque limit has been reached. The device operates by transmitting torque between two axial members, a drive member and a driven member, having a plurality of balls therebetween with the balls engaged within precisely shaped sockets contained within each axial member. As excess torque occurs, the plurality of balls cause the driven member to axially displace with respect to the drive member, engaging a set of teeth contained on the driven member with a second set of teeth aligned with the first set of teeth and restrained within the housing, thereby preventing torque transmission. The second set of teeth is allowed to rotate, relative to the housing, through a predetermined angle into a torsionally compliant mount before contacting substantially rigid structure. This allows the teeth to engage smoothly at higher operating speeds. Indication of the torque overload event is achieved by detecting the limited motion of the second set of teeth relative to the housing with a slidably mounted plunger within the housing and axially located by a detent in the member containing the second set of teeth.

9 Claims, 9 Drawing Sheets

ROTATED 90°

66 OMITTED

66 AND 76 OMITTED

78 OMITTED

78 AND 76 OMITTED

TORQUE LIMITER WITH TRIP INDICATOR

BACKGROUND OF THE INVENTION

1. Field of the Invention

The present invention pertains to torque limiting devices and torque limiting devices with trip indicators.

2. Background Information

The present invention is well adapted for use in aircraft flight controls, such as trailing edge flap systems where a plurality of torque responsive elements are driven from a single drive source. However, the invention can be practiced in any system where the drive unit must be prevented from exerting excessive torque.

A typical form of the prior art wing flap torque lockout system is shown in U.S. Pat. No. 4,030,578 to Cacciola et al. In that patent, the device operates by transmitting torque between two axial members through a ball-ramp coupling. The ball-ramp coupling comprises a plurality of balls interposed between the two axial members, with the balls engaged within precisely shaped sockets contained within each axial member. As excess torque occurs, the plurality of balls cause one member to axially displace with respect to the other member compressing a disc brake pack allowing the excess torque to be reacted in the housing, thereby preventing torque transmission. The disc brake pack is comprised of alternating stationary and rotating friction plates.

While this torque limiter has been used successfully on many applications, it is greatly affected by the friction coefficient of the disc brake members and the viscous drag torque, which is related to the plurality of plates, lubricating medium and the rotational speed. This viscous drag torque of the disc brake members causes a significant loss of drive system efficiency and increases drive system weight.

Disc brake packs have been used for many applications because the operating speeds exceed the engagement speed for which toothed, or jaw clutches should be used. At higher operating speeds, a disc brake pack is typically used. Trailing edge flap systems typically operate at speeds in excess of 400 rpm.

One attempt to eliminate the disc brake pack and the adverse effects associated with it is disclosed in U.S. Pat. No. 5,299,666 to Lang et al. In this patent, the device operates by transmitting torque between two axial members, a drive member and a driven member, having a plurality of balls therebetween. The plurality of balls engage sockets contained within each of the axial members. As excess torque occurs, the plurality of balls causes the drive member to axially displace with respect to the driven member. A first set of teeth contained on the drive member engage with a second set of teeth aligned to the first set of teeth and fixed to the housing to prevent torque transmission.

The problem with this device stems from the fact that the first set of teeth is contained on the drive member. The placement of the first set of teeth on the drive member prevents the torque produced by the contact of the teeth from being transmitted across the plurality of balls. Consequently, no additional axial force is developed by the ball-ramp coupling to aid the engagement of the teeth. To solve this problem, the teeth are required to have a negative pressure angle so that they can pull themselves into engagement. The negative pressure angle on the teeth is expensive to manufacture and is not suitably robust for continued service in many aircraft drive systems. Any degradation to the edges of the teeth caused by repeated use will cause the teeth not to engage upon contact, and will lead to excessive torque output. Additionally, the negative pressure angle on the teeth makes it necessary to slowly reverse the direction of the drive system to allow the brake to disengage. Many drive systems require a torque limiting device that disengages automatically, upon removal of input torque.

It is also common to provide a trip indicator that indicates when the torque limiter has been activated. Modern aircraft have multiple torque limiting brake mechanisms. The trip indicators are used for troubleshooting purposes, to determine which torque limiter has activated. Many of the prior art trip indicators produce false trip indications, meaning a trip is indicated when the torque limiter has not been activated. Most prior art trip indicators utilize the axial motion of the output cam to actuate the indicator. It is possible to have a small amount of axial motion of the output cam trip the indicator but not energize the braking mechanism. This produces a false trip indication. A false trip indication makes troubleshooting the drive system difficult and can lead to unnecessary maintenance activity.

SUMMARY OF THE INVENTION

According to an aspect of this invention, the torque limiter does not rely on a disc brake pack for its braking mechanism and will automatically disengage upon removal of the input torque. Moreover, the torque limiter of this invention has a trip indicator that is inherently more reliable than any other trip indicator known to the applicant.

According to an embodiment of this invention, a torque limiter limits the amount of torque from a drive source supplied to a torque responsive element. The torque limiter locks the drive source to substantially rigid structure when the drive torque exceeds a predetermined and adjustable maximum limit. This is referred to as a torque limiter "trip" or "lockout". The torque limiter can be adapted to operate in either of two directions of rotation and automatically resets when excessive drive torque is removed.

The torque limiter of this invention comprises a housing and an input cam rotatably secured to the housing and adapted to be connected to a drive source. An output cam is coupled to the input cam through a ball-ramp coupling. The input cam and output cam are biased towards one another with a spring stack. An output shaft is slidably secured to the output cam and adapted to be connected to a torque responsive element. During normal operation, torque from the drive source is transferred from the input cam through the ball-ramp coupling to the output cam, then through the output shaft to a torque responsive element. The output cam has a set of teeth coaxially aligned to a second set of teeth on a stator plate mounted within the housing. When the torque at the input cam exceeds a predetermined level, the ball-ramp coupling overcomes the preload in the spring stack and displaces the output cam in an axial direction away from the input cam. The axial displacement of the output cam forces the set of teeth on the output cam into contact with the set of teeth on the stator plate. The braking torque induced by the contact of the teeth on the output cam with the teeth on the stator plate is transmitted across the ball-ramp coupling, causing additional axial displacement, which forces the teeth fully into mesh, locking the drive source to the housing. Once the torque returns to below the predetermined torque limit, the spring stack forces the output cam axially towards the input cam, returning the balls to their sockets, disengaging the teeth and resetting the torque limiter.

To provide more immediate meshing of teeth, in applications operating at higher speeds, it is preferred to provide a torsionsally compliant mount between the teeth on the stator plate and the housing. This allows the ball-ramp coupling to fully engage the teeth on the output cam with the teeth on the stator plate before the drive source is stopped and the full dynamic torque is seen by the teeth.

Another embodiment of the torque limiter according to this invention comprises a torque limiter with trip indicator. The trip indicator comprises a plunger mounted partially within a "vee" shaped notch on the stator plate. When the predetermined output torque is exceeded and the teeth begin to mesh and the stator plate rotates through a predetermined angle into the torsionally compliant mount, the plunger is forced out of the "vee" shaped notch in the stator plate and assumes a position which indicates a trip or lockout. The fact that the stator plate motion is utilized to actuate the trip indicator makes false indications highly improbable, because stator plate motion only occurs after the teeth are in contact, at which point a lockout is imminent.

DESCRIPTION OF A PREFERRED EMBODIMENT

Figure 1A:
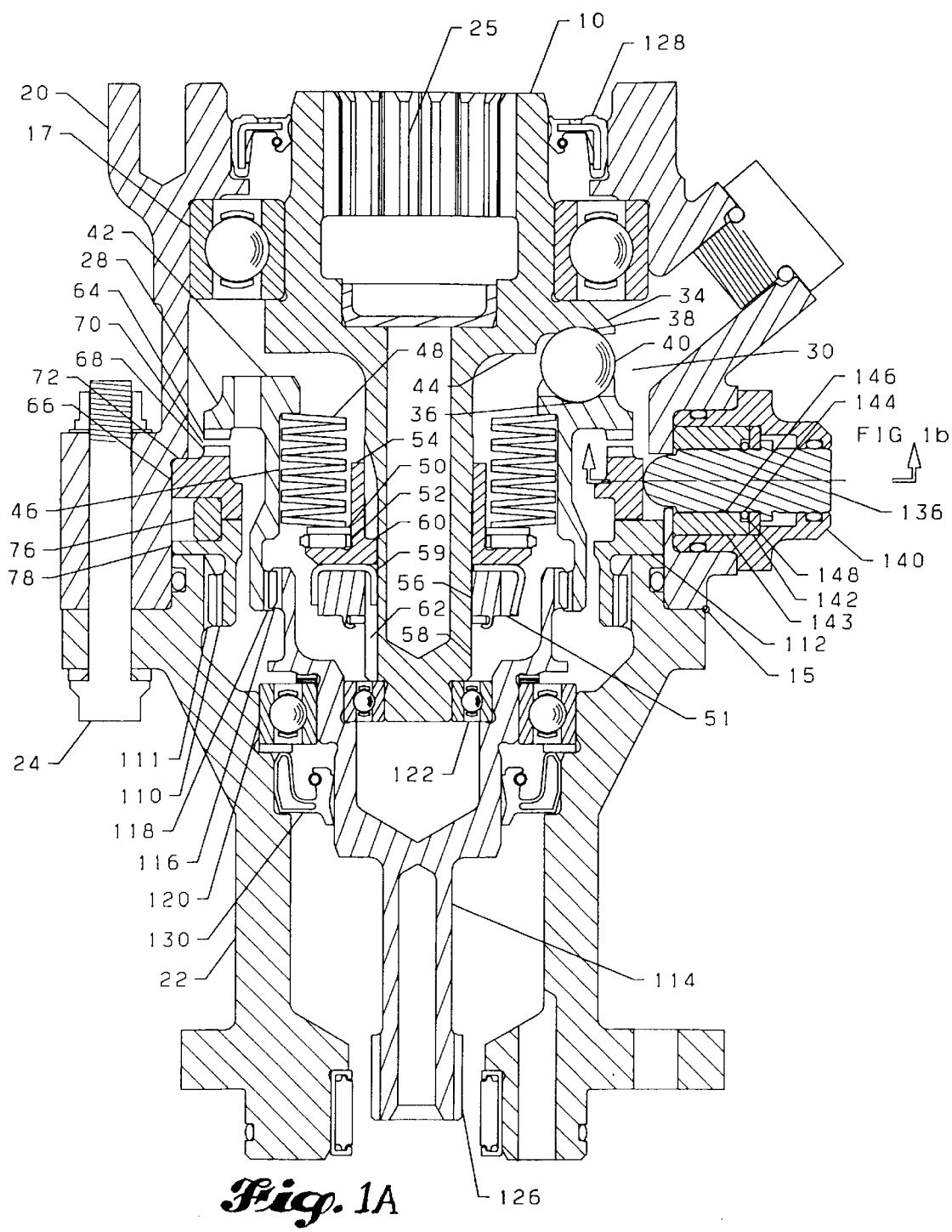
FIG. 1A is a sectional view of the torque limiter of a preferred embodiment of this invention.
Figure 1B:
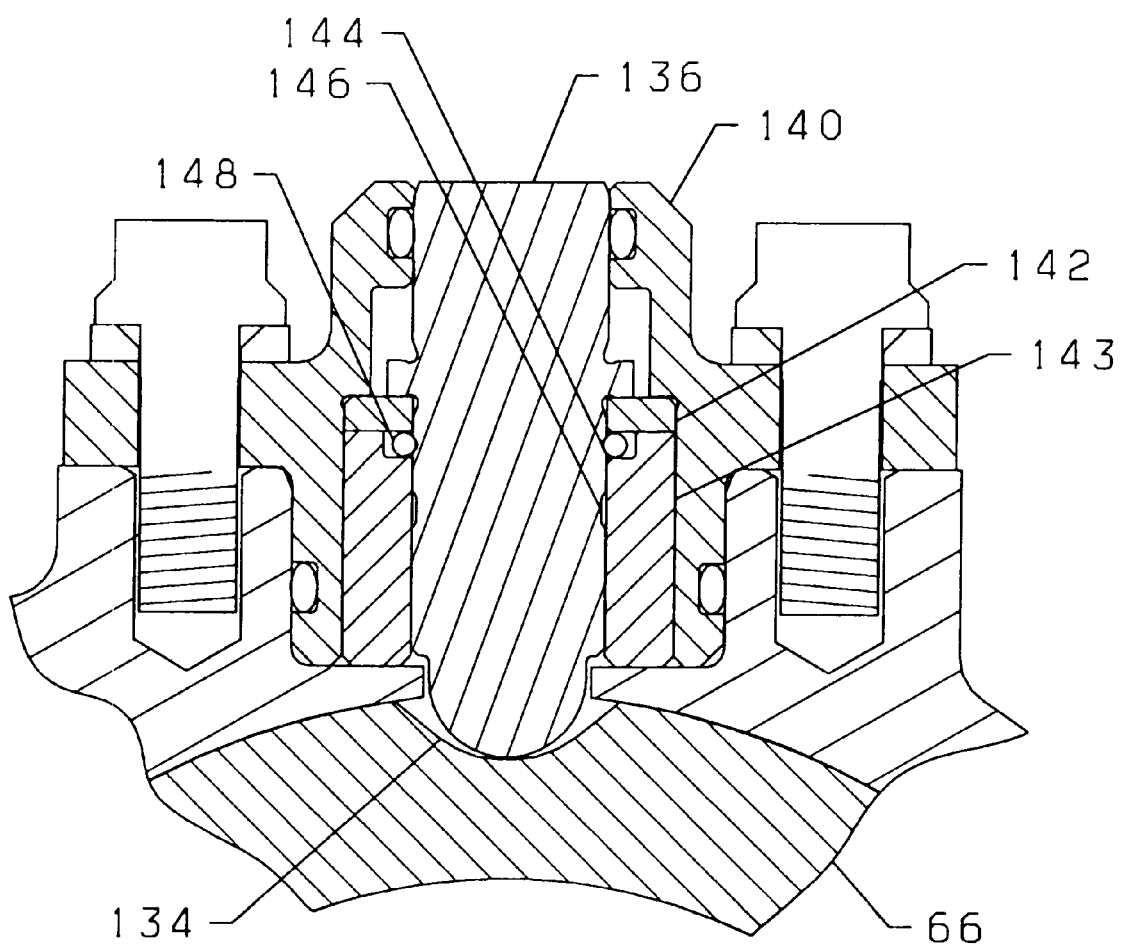
FIG. 1B is an enlarged cross-sectional view of a trip indicator taken at the line indicated as "FIG. 1b" in FIG. 1A.
Figure 2A:
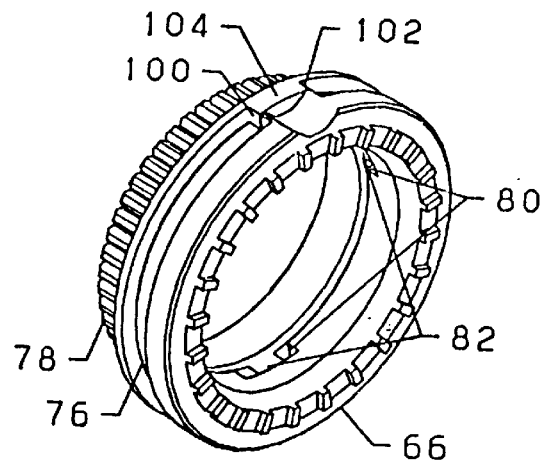
FIG. 2A is a perspective view that shows the components of a torsionally compliant mount according to a preferred embodiment.
Figure 2B:
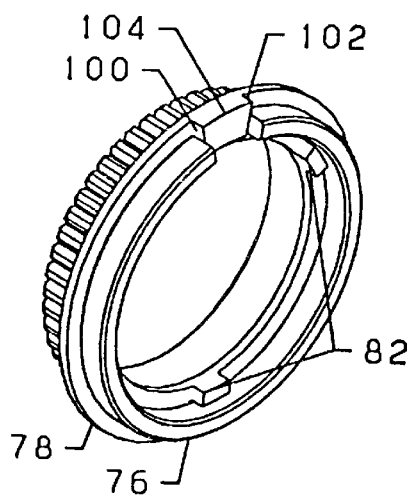
FIGS. 2B and 2C are perspective views of FIG. 2A with designated parts omitted for clarity.
Figure 2C:
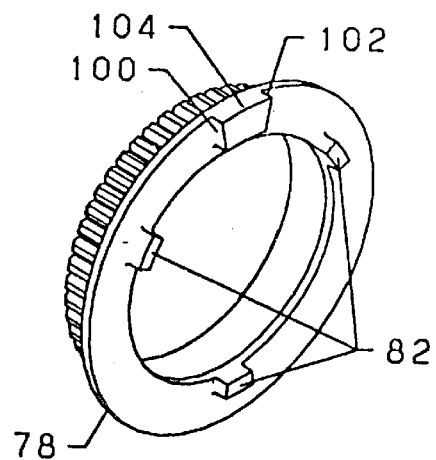
Figure 3A:
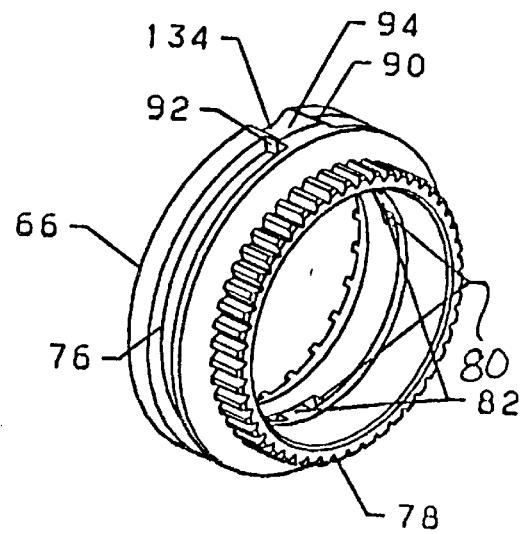
FIG. 3A is a perspective view of the mount of FIG. 2A as viewed from the opposite direction as FIG. 2A.
Figure 3B:
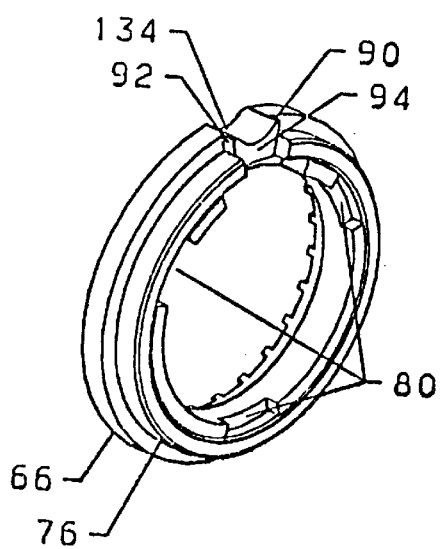
FIGS. 3B and 3C are perspective views of the mount of FIG. 2A as viewed from the opposite direction as FIG. 2B, with designated parts omitted for clarity.
Figure 3C:
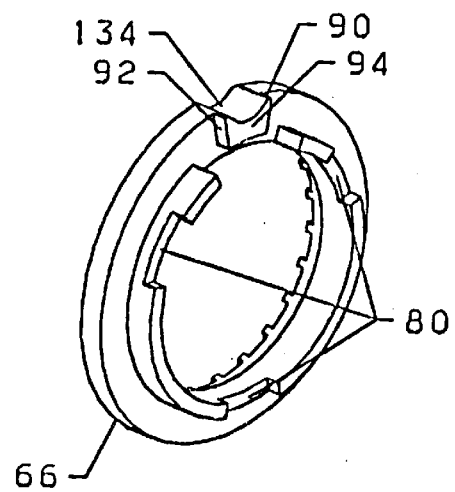
Figure 4A:
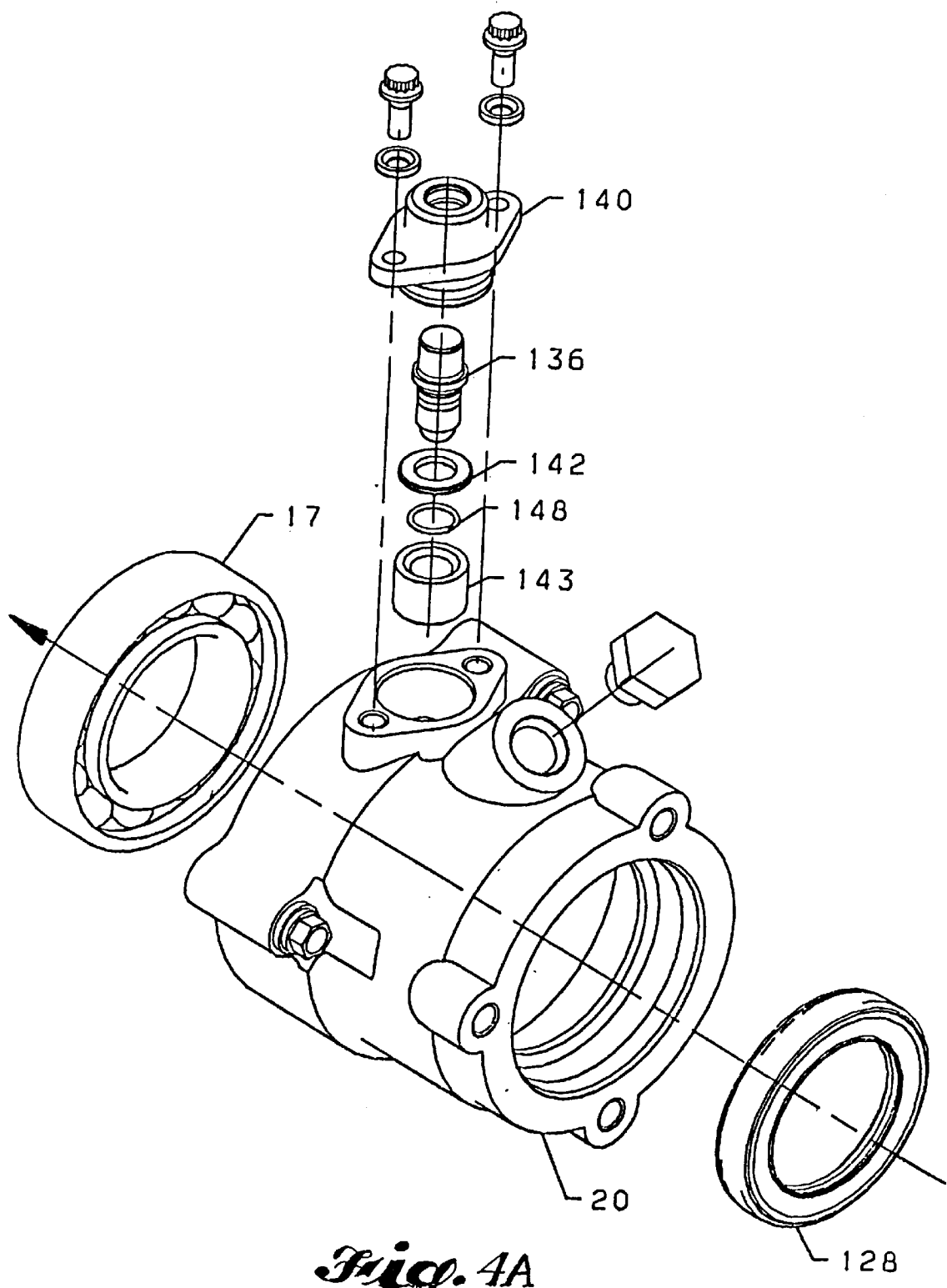
FIG. 4A is a connected, exploded perspective view that shows components of the torque limiter and trip indicator of a preferred embodiment.
Figure 4B:
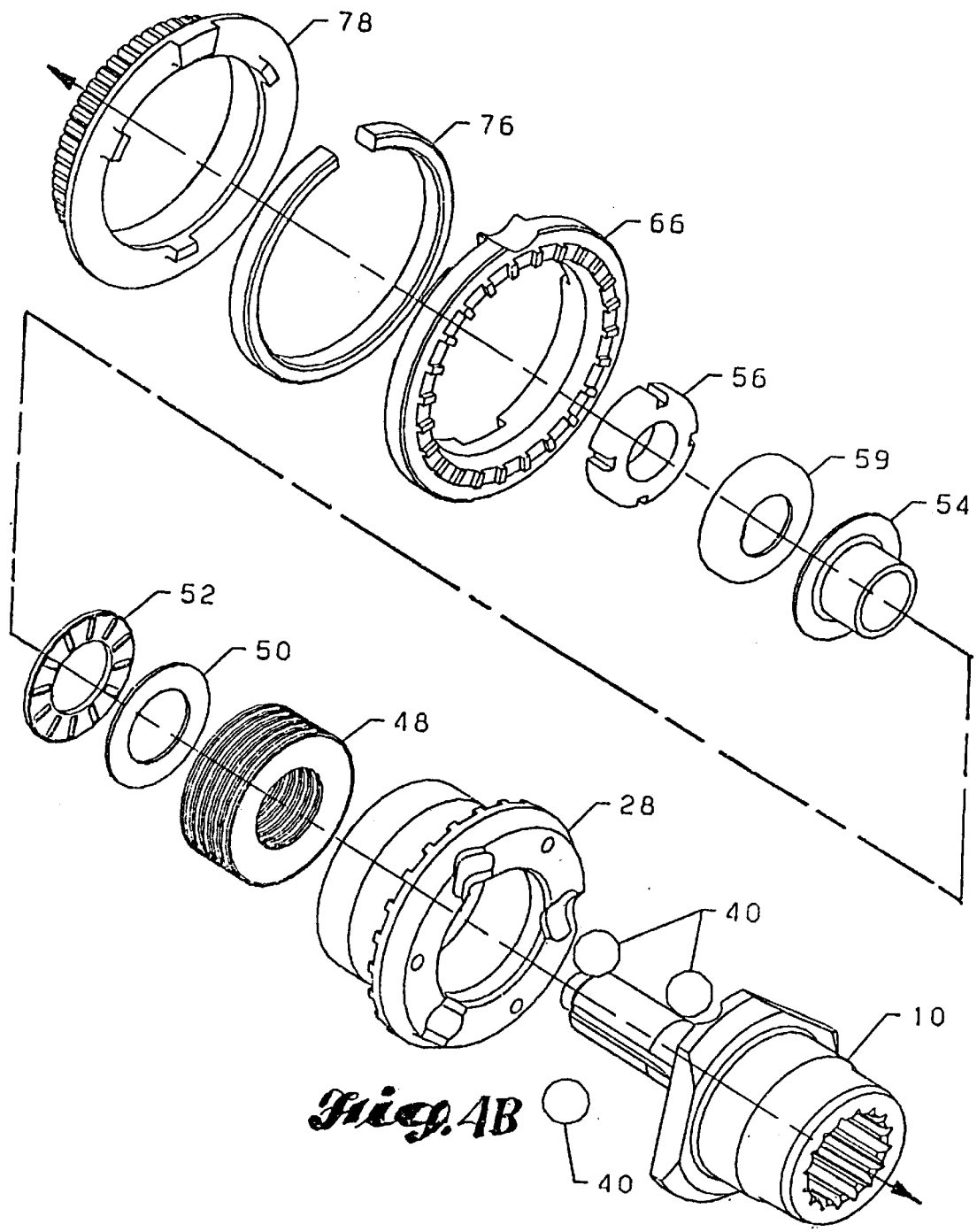
FIG. 4B is a connected, exploded perspective view that shows components of the torque limiter and the torsionally compliant mount of a preferred embodiment.
Figure 4C:
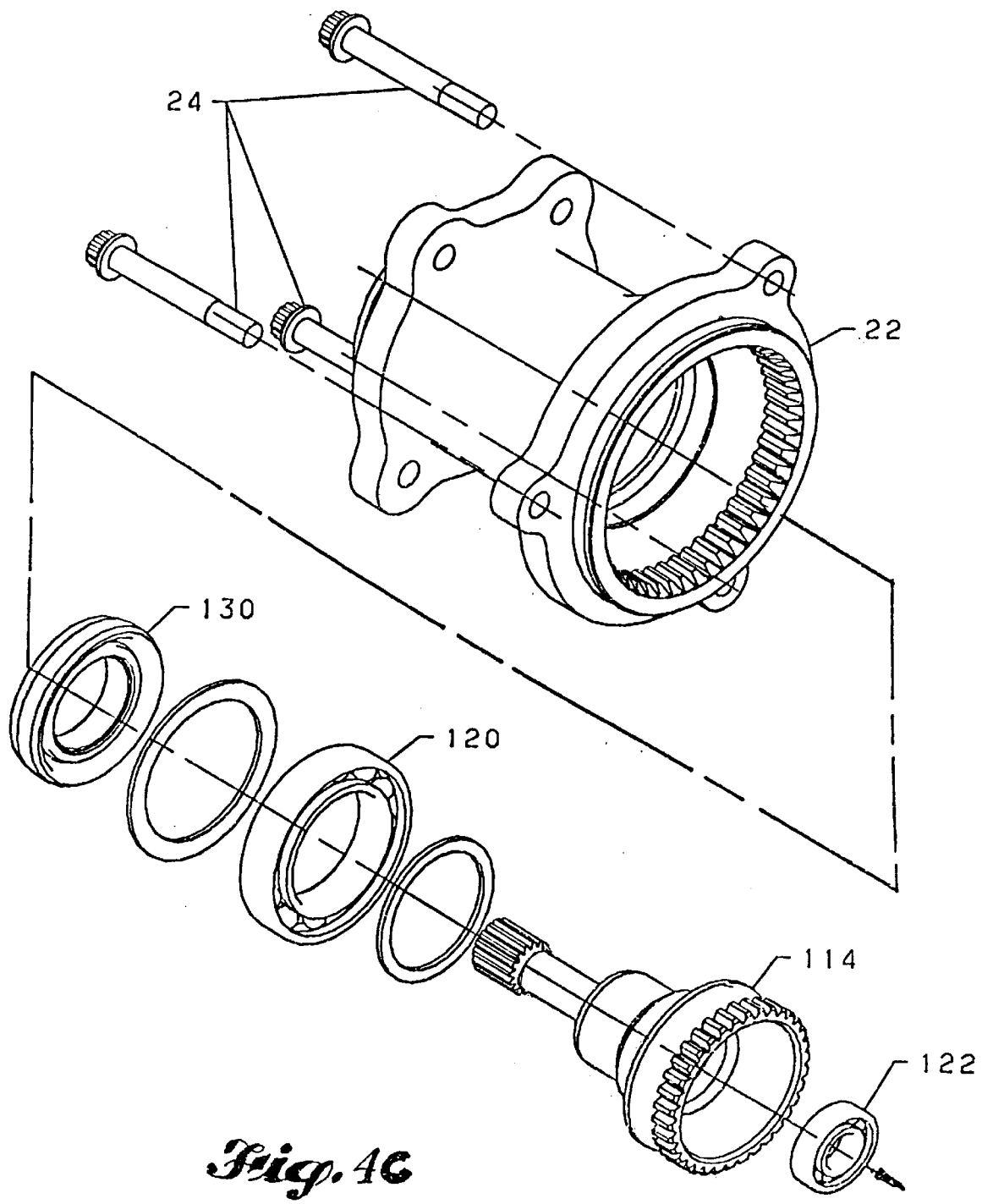
FIG. 4C is a connected, exploded perspective view that shows components of the torque limiter of a preferred embodiment.

An embodiment of the torque limiter according to this invention is shown in FIGS. 1a, 1b, 4a and 4b, wherein like numbers correspond to identical or corresponding parts. A torque limiter comprises an input cam 10 rotatably mounted within a housing 15 through a ball bearing 17. The housing 15 comprises a lower housing 22 connected to an upper housing 20 by a plurality of bolts 24. The terms "upper" and "lower" refer to the drawing as shown and are for convenience sake only as the torque limiter can assume any orientation when in operation.

Into one end of the input cam 10 is machined a spline 25 that is adapted to receive a drive source (not shown). An output cam 28 is coupled to the input cam 10 through a ball-ramp coupling 30 that transmits torque from the input cam 10 to the output cam 28.

The ball-ramp coupling 30 comprises a flange 34 that extends outwardly from the input cam 10 in a direction substantially transverse to the axis of the input cam 10. The flange 34 includes an input cam plate 44 into which a plurality of ball detent sockets 38 are formed at equally spaced intervals around its circumference. The ball detent sockets 38 accommodate a plurality of balls 40. The output cam 28 slidably mounts coaxially over a portion of the input cam 10. The output cam 28 has an output cam plate 42, with a plurality of ball detent sockets 36 formed therein. These ball detent sockets 36 have identical shapes, both in the axial and radial directions, as the ball detent sockets 38 on the input cam plate 44. The plurality of balls 40 are interposed between the ball detent sockets 38 and 36 to couple torque from the input cam 10 to the output cam 28. Due to the symmetry of the ball detent sockets 38 and 36, the lockout torque is equivalent whether the drive source is rotating in the clockwise or counterclockwise direction.

The output cam has an internal cylindrical feature which acts as a spring cage 46. A plurality of springs 48, typically Belleville springs, are slidably mounted concentrically about the input cam 10 and within the spring cage 46. The springs 48 are retained within the spring cage 46 by a thrust plate 50, a thrust bearing 52 and a thrust bushing 54. The thrust bearing 52 and the thrust bushing 54 both slidably contact the input cam 10. The thrust bearing 52 abuts the thrust plate 50 and allows for slight rotation between the thrust bushing 54 and the thrust plate 50. The thrust bushing 54 abuts a nut 56 which engages the input cam 10 through a plurality of threads 58 contained on the input cam 10. The thrust bushing 54 has a key 60 which is adapted to fit slidably within a keyway 62 located on the input cam 10. The position of the nut 56 determines the spring compression to allow for a multiplicity of torque lockout settings. The axial force of the plurality of springs 48 bias the output cam 28 toward the input cam 10 trapping the plurality of balls 40 within the plurality of detent sockets 38 and 36. The axial force of the plurality of springs 48 together with the geometry of the output cam detent socket surface 36 and the input cam detent socket surface 38 establishes a maximum torque value which can be transmitted through the device, without inducing lockout. Said maximum torque value shall be referred to as the lockout torque. Lockwasher 59 abuts and partially encloses the adjustment nut 56. After desired torque lockout setting is achieved, as established by the position of the adjustment nut 56, locking of the nut 56 is accomplished by deforming a portion of the lockwasher 59 into a notch 51 on the nut 56. On experiencing an excess torque above said lockout torque, the axial force from the plurality of springs 48 will be overcome and the output cam 28 will be cammed axially away from the input cam 10. The plurality of balls 40 will ride out of the detent sockets 38 and 36 and force the output cam 28 axially away from the input cam 10, compressing the springs 48. While the nut 56 can be used to set the torque lockout settings, it is also possible to use shims to establish the preload of the springs and thereby set the torque lockout setting.

The output cam 28 has a set of teeth 64. The teeth 64 are preferably equally spaced radial teeth. These teeth 64 may either be mounted onto the output cam 28 as a separate part, or preferably formed as part of the output cam itself.

A stator plate 66 has a second set of teeth 68 coaxially aligned with the set of teeth 64 on the output cam 28. The second set of teeth 68 are identical to the set of teeth 64 on the output cam 28. The two sets of teeth 64 and 68 are separated by a predetermined axial gap 70.

The stator plate 66 is rotatably mounted within the upper housing 22 and abuts a shoulder 72 with the upper housing 22. The rotatable mounting is accomplished through a torsionally compliant mount which comprises the stator plate 66, a ring spring 76 and a reaction plate 78 as shown in FIGS. 2a, 2b, 2c, 3a, 3b and 3c.

The torsionally compliant mount and its components are shown in FIGS. 2a, 2b, 2c, 3a, 3b and 3c. The stator plate 66 has a plurality of radial spaces 80 as shown in FIGS. 2a, 2b, 2c, 3a, 3b and 3c. The radial spaces 80 will preferably be equally spaced. The reaction plate 78 has a plurality of radial flanges 82 which correspond to the plurality of radial spaces 80 on the stator plate 66 as shown in FIGS. 2a, 2b, 2c, 3a, 3b and 3c. The plurality of radial spaces 80 are larger than the plurality of radial flanges 82 to allow for a predetermined degree of rotation before the plurality of flanges 82 contact sides of the plurality of radial spaces 80. The plurality of radial flanges 82 are normally held in a centered position within the plurality of radial spaces 80 by a ring spring 76 as shown in FIGS. 2a, 2b, 2c, 3a, 3b and 3c. The ring spring 76 is preferably rectangular in cross section, with a small annular segment removed to accommodate simultaneous abutment with radial key 94 on stator plate 66 and radial key 104 on reaction plate 78, such that angular rotation between stator plate 66 and reaction plate 78 causes the ring spring 76 to expand to a larger diameter and apply an opposing biasing force to the radial keys 94 and 104. The ring spring 76 is rotatably mounted on the stator plate 66 and abuts both sides 90 and 92 of a radial key 94 on the stator plate 66, during normal operation. The difference between the width of the flanges 82 and the width of the spaces 80 determine the angle through which the stator plate 66 can rotate relative to the reaction plate 78 before the flanges 82 contact the sides of the spaces 80. The ring spring 76 is also simultaneously rotatably mounted on the reaction plate 78 and abuts both sides 100 and 102 of a second radial key 104 on the reaction plate 78, during normal operation. As rotation occurs between the stator plate 66 and the reaction plate 78, during a lockout, the ring spring 76 is expanded to a larger diameter by the radial key 94 in the stator plate 66 and the radial key 104 in the reaction plate 78. This imparts a force and corresponding torque onto the radial key 94 on stator plate 66, proportional to the relative angular rotation between the stator plate 66 and the reaction plate 78. The stator plate 66 will continue to rotate and the ring spring 76 will continue to expand to a larger diameter until a hard stop is reached when the plurality of flanges 82 contacts the sides and of the plurality of spaces 80. It will be apparent to persons of ordinary skill in the art upon studying the information herein that a number of spring, key, radial flange and radial space configurations would be possible for the torsionally compliant mount to serve as a rotational shock absorber.

Referring back to FIGS. 1a, 1b, 4a and 4b, the reaction plate 78 has a spline 110 which connects to spline 111 in the lower housing 20 and abuts a shoulder 112 on the lower housing 20. The lower housing 20 is secured to a substantially rigid structure.

An output shaft 114 has a spline 116 which connects to a spline 118 on the output cam 28. The output shaft is rotatably mounted to the lower housing through a ball bearing 120. The output shaft is rotatably mounted to the input cam 10 through a ball bearing 122. The ball bearing allows for a small amount of rotation to occur between the input cam 10 and the output shaft 114 during lockout. The output shaft has a spline 126 adapted to connect to a torque responsive element (not shown).

A lip seal 128 is slidably mounted between the upper housing 22 and the input cam 10 to provide dynamic sealing. The upper housing has a fill port, with a fill plug, to provide lubrication to the torque limiter. Another lip seal 130 is provided between the output shaft and the lower housing. The above mounting and sealing techniques are well known to persons of ordinary skill in the art and will not be discussed further.

A further preferred embodiment of the torque limiter according to this invention, includes a trip indicator. The trip indicator comprises a "vee" shaped notch 134 in the stator plate 66 which aligns with a plunger 136 such that the plunger 136 normally rests in the "vee" shaped notch 134. The plunger 136 is slidably mounted within an indicator housing 140 and a bushing 143. The plunger is axially located by one of two circumferential grooves 144 and 146 which interface with a catch ring 148. Catch ring 148 is captured between spacer 142 and bushing 143. When the circumferential groove 144 is interfaced with the catch ring 148, the plunger 136 is in the untripped position. When the circumferential groove 146 is interfaced with the catch ring 148 the plunger 136 is in the tripped position. The plunger 70 is forced from the untripped position to the tripped position when the stator plate 66 is forced to rotate during a lockout causing the plunger 136 to ride up out of the "vee" shaped notch 134 in the stator plate 66.

A number of pin, plunger and spring configurations will be apparent to persons of ordinary skill in the art upon studying this disclosure. It would also be possible for the trip indicator to operate using the axial motion of the output cam of the ball-ramp coupling as it approaches the lockout position. This is a less preferred embodiment since the trip indicator would trip before lockout has occurred, causing the possibility of a false trip indication. Embodiments of the trip indicator which rely on the rotation of the stator plate or housing are preferred because they will only trip after the stator plate has rotated. Rotation of the stator plate only occurs after the teeth begin to engage at which point a lockout is imminent, hence only a real trip will be indicated.

Figure 5:
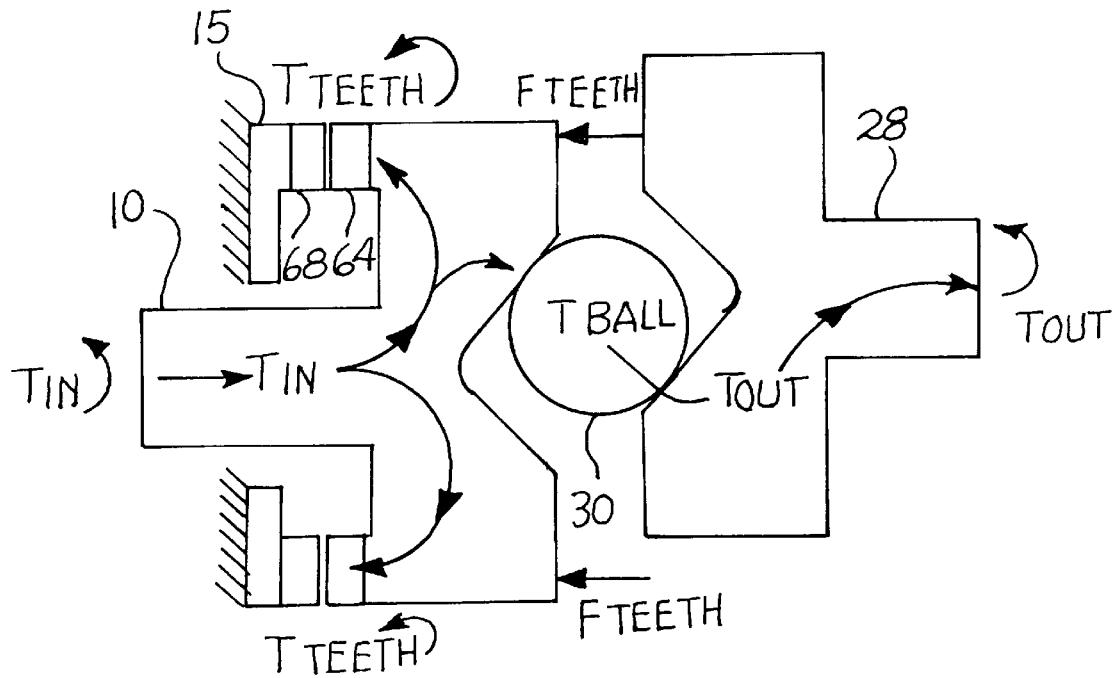
FIG. 5 is a prior art schematic of a ball ramp coupling with teeth on the drive element.
Figure 6:
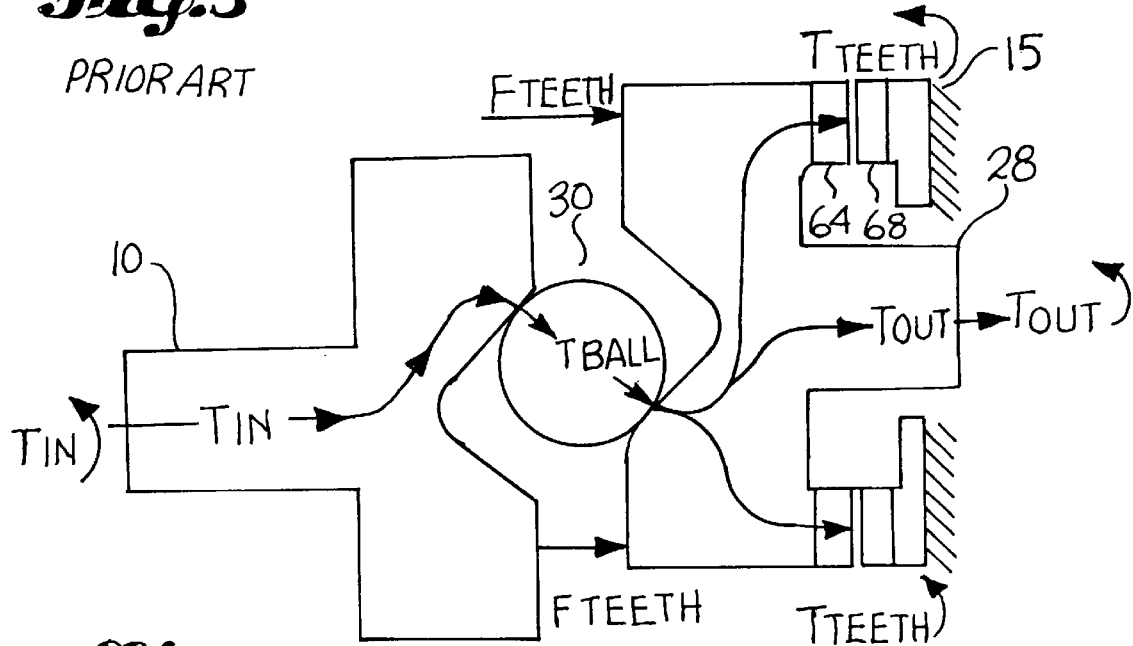
FIG. 6 is a schematic representation of a ball ramp coupling with teeth on a driven element.

Referring now to FIGS. 5 AND 6, which show respectively a diagrammatic view of the prior art torque limiter and the torque limiter of the present invention. In the prior art torque limiter, FIG. 5, the teeth 64 and 68 respectively are mounted on the input cam 10 and the housing 15. When the predetermined torque level is reached the ball-ramp coupling 30 will force the input cam 10 axially away from the output cam 28. The teeth 64 on the Input cam will contact the teeth 68 on the housing 15 braking the input cam 10. The force pushing the teeth into mesh given by:

$T_{in}$ is input torque.

$T_{out}$ is output torque.

$T_{teeth}$ is torque induced by teeth.

$T_{ball}$ is torque transmitted across the balls.

$F_{teeth}$ is the force pushing the teeth into mesh.

C is a constant which relies on geometry and friction $T_{in} = T_{teeth} + T_{ball}$ $F_{teeth} = C \times T_{ball}$ $T_{ball} = T_{out}$ $\therefore F_{teeth} = C \times (T_{out})$ Since the teeth are on the input cam 10, the force available to push the teeth into mesh is a function of the output torque only. Consequently, to develop the force necessary to push the teeth into mesh, the output torque must be increased above the torque lockout setting, which can damage downstream equipment. To fix this problem, the teeth must have a negative pressure angle FIG. 7 to allow the teeth to essentially pull themselves into mesh. This makes the torque lockout setting very sensitive to the edge condition of the teeth, because if they are not suitable sharp, additional force is required to cause them to engage. This causes excessive output torque which can damage downstream equipment. The sharp edges on the teeth would be likely to degrade after repeated use. In general, this type of design would not be considered suitably robust for many aircraft flight control systems. Additionally, the negative pressure angle on the teeth makes it difficult to unlock the torque limiter device. If the input torque drops below the torque lockout setting the torque limiter remains locked because the teeth are essentially locked together. If the input cam 10 of the torque limiter is rotated quickly in the opposite direction, the teeth 64 and 68 may contact the opposite flanks of the mating teeth, causing a lockout in the opposite direction. It may be necessary to turn the input cam 10 slowly in the opposite direction to get the torque limiter to unlock. This is unacceptable for many aircraft flight control systems.

FIG. 6 is a simplified schematic with torsionally compliant mount omitted for ease of illustration. In FIG. 6, the teeth 64 and 68 respectively are mounted on the output cam 28 and the housing 15. When the predetermined torque level is reached the ball-ramp coupling 30 will force the output cam 28 axially away from the input cam 10. The teeth 64 on the output cam 28 will contact the teeth 68 on the housing 15 braking the output cam 28. The force pushing the teeth into mesh given by:

$T_{in}=T_{ball}$
$F_{teeth}=C \times T_{ball}$
$T_{ball}=T_{out}+T_{teeth}$
$\therefore F_{teeth}=C \times (T_{out}+T_{teeth})$ Since the teeth are on the output cam 28, the force available to push the teeth 64 and 68 into mesh is a function of the sum of the output torque and the torque induced by the contact of the teeth 64 and 68. Consequently, the torque induced by the contact of the teeth 64 and 68 generates the additional force necessary to push the teeth 64 and 68 into mesh, and no additional increase of the output torque takes place. This allows the use of teeth with zero pressure angle FIG. 8, meaning the flanks of the teeth are parallel to the centerline of the output cam 28. This type of tooth configuration is very easy to produce and is suitable robust to accommodate repeated torque limiter lockouts. Additionally, since negative pressure angle teeth are not used, once the torque returns to below its predetermined level the torque limiter, the spring stack will displace the output cam 28 towards the input cam 10 disengaging the teeth 64 and 68 and automatically unlocking the torque limiter.

Figure 7:
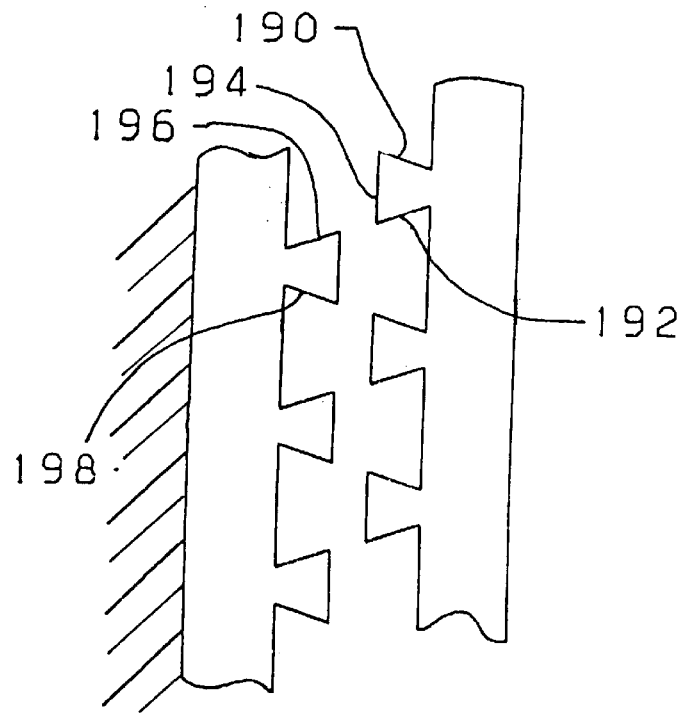
FIG. 7 is a prior art schematic representation of brake teeth with a negative rake angle.
Figure 8:
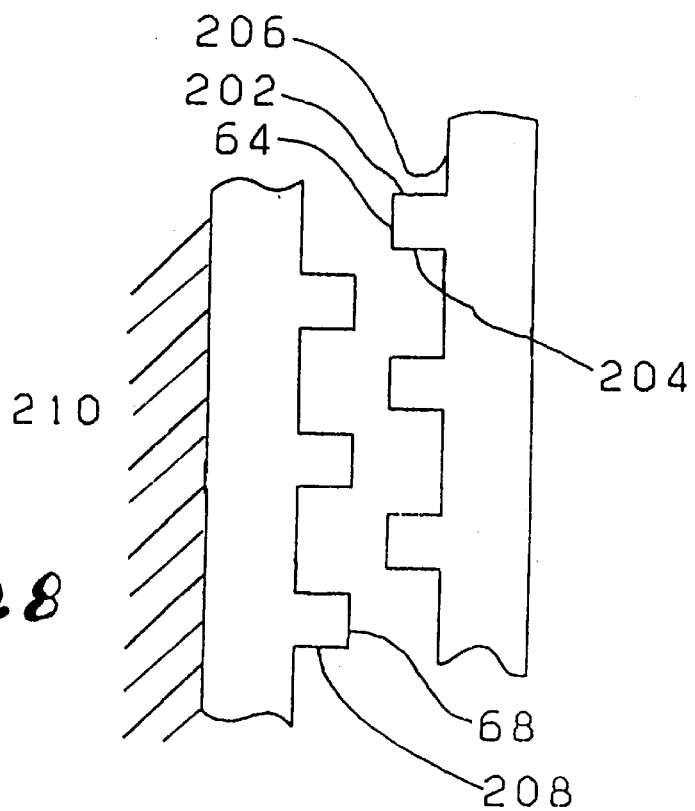
FIG. 8 is a schematic of straight-sided brake teeth with approximately zero rake angle, as used in a preferred embodiment of this invention.

Referring now to FIGS. 7 and 8, showing both tooth configurations, FIG. 7 shows teeth having a negative pressure angle taught in the prior art. Each side 190 and 192 of each tooth 194 includes a diagonally inward extending surface, which defines a negative pressure angle for both sides 190 and 192 of the associated tooth 194. The teeth on the corresponding brake mounted to the housing also have corresponding diagonally inward extending surfaces 196 and 198.

FIG. 8 shows the teeth used according to the present invention. Notice that the sides 202 and 204 of the teeth 64 are substantially perpendicular to the top surfaces 206 and show zero pressure angle. The sides 208 and 210 of the teeth 68 are substantially parallel to the sides 202 and 204 of the teeth 64 and aligned such that they will come into mesh with each other. While it is a preferred embodiment to have substantially square profiles for the teeth, it would be possible to have a positive pressure angle, Spiroid or numerous other types of teeth. Negative pressure angle teeth would however be inappropriate as it would not allow for the automatic resetting of the torque limiter.

Accordingly, the foregoing disclosure and description thereof are for illustrative purposes only and are not intended to limit the invention. There may be many minor variations which will be apparent to a person of ordinary skill in the art upon reading this disclosure. This invention is defined by the claims.

What is claimed is:

1. A torque limiter for limiting the amount of torque from a drive source supplied to a torque responsive element, and for locking said drive source to a torque isolated path when drive torque exceeds a predetermined and adjustable maximum limit, which is adapted to operate in either of two directions of rotation and automatically resets when the excessive drive torque is removed comprising:

a) a housing;

b) an input cam rotatably secured to said housing and adapted to be connected to a drive source, said input cam including a flange with an input cam plate containing a plurality of ball detent sockets;

c) an output cam containing an output cam plate with a plurality of ball detent sockets which are located to correspond in spacing and shape to said detent sockets in said input cam plate, said output cam adapted to slidably mount coaxially over a portion of said input cam;

d) a plurality of balls adapted to fit within said detent sockets in said cam plates, said balls cooperate in the transmission of torque from said input cam to said output cam and displace said output cam in an axial direction away from said input cam when relative rotation occurs between said input cam and said output cam;

e) at least one spring biasing said output cam toward said input cam so as to locate said plurality of balls in said detent sockets in said cam plates for permitting axial displacement of said output cam upon application of torque in excess of said predetermined maximum limit;

f) a first set of teeth carried by said output cam;

g) a stator plate having a second set of teeth coaxially aligned with said first set of teeth; and h) a torsionally compliant mount which mounts said stator plate to said housing, wherein said torsionally compliant mount allows said stator plate to rotate through a predetermined angle while simultaneously imparting a torque to said stator plate in a direction opposing said rotation.

2. The torque limiter as claimed in claim 1, further comprising a torque limit adjustment.

3. The torque limiter as claimed in claim 2, in which said torque limit adjustment comprises:

a) said spring biasing said output cam toward said input cam, the compression of said spring determining the torque limit, and b) a nut mounted concentrically about and threadedly engaged to said input cam, said nut adjusting the compression of said spring to establish the torque limit.

4. The torque limiter as claimed in claim 1, wherein said first and second sets of teeth do not have a negative rake angle.

5. The torque limiter as claimed in claim 1, wherein said first and second sets of teeth have substantially rectangular profiles.

6. A torque limiter for limiting the amount of torque from a drive source supplied to a torque responsive element, and for locking said drive source when drive torque exceeds a predetermined and adjustable maximum limit, which is adapted to operate in either of two directions of rotation and automatically resets when the excessive drive torque is removed comprising:

a) a housing;

b) an input cam rotatably secured to said housing and adapted to be connected to a drive source, said input cam including a flange with an input cam plate containing a plurality of ball detent sockets;

c) an output cam containing an output cam plate with a plurality of ball detent sockets which are located to correspond in spacing and shape to said detent sockets in said input cam plate, said output cam adapted to slidably mount coaxially over a portion of said input cam;

d) a plurality of balls adapted to fit within said detent sockets in said cam plates, said balls cooperate in the transmission of torque from said input cam to said output cam and displace said output cam in an axial direction away from said input cam when relative rotation occurs between said input cam and said output cam; and e) at least one spring biasing said output cam toward said input cam so as to locate said plurality of balls in said detent sockets in said cam plates for permitting axial displacement of said output cam upon application of torque in excess of said predetermined maximum limit;

f) a first set of teeth carried by said output cam;

g) a stator plate secured to said housing, said stator plate having a second set of teeth coaxially aligned with said first set of teeth, and a plurality of spaces formed thereon, said stator plate having a first key, and h) a torsionally compliant mount which mounts said stator plate to said housing, wherein said torsionally compliant mount includes:

i) a reaction plate having a plurality of flanges adapted to accommodate said plurality of spaces on said stator plate and a second key aligned with said first key, said plurality of spaces being larger than said plurality of flanges to allow a predetermined degree of rotation between the stator plate and the reaction plate, and ii) a ring spring interposed between said stator plate and said reaction plate, said ring spring having two ends abutting said first and second key.

7. The torque limiter as claimed in claim 6, further comprising a trip indication means for indicating when a torque lockout has occurred.

8. The torque limiter as claimed in claim 7, further comprising means for indicating a torque lockout by said stator plate having a "vee" shaped notch engaged with a plunger, such that rotation of said stator plate displaces said plunger out of said notch, indicating a torque lockout has occurred.

9. The torque limiter as claimed in claim 8, further comprising means for retaining the position of said plunger by a circular catch ring engaged within one of two circumferential grooves in said plunger, wherein one groove retains the plunger in the untripped position and the other groove retains the plunger in the tripped position.

* * * * *